US012617657B2

(12) United States Patent
Thubet et al.

(10) Patent No.: US 12,617,657 B2
(45) Date of Patent: May 5, 2026

(54) METHOD FOR PROTECTING A LIFTING MEMBER AGAINST AN OVERLOAD AND DEVICE IMPLEMENTING THIS METHOD

(71) Applicant: Reel, Saint Cyr Au Mont D'or (FR)

(72) Inventors: Thomas Thubet, Fos-sur-Mer (FR); Sébastien Decreusefond, Pelissanne (FR)

(73) Assignee: Reel, Saint Cyr Au Mont d'Or (FR)

( * ) Notice: Subject to any disclaimer, the term of this patent is extended or adjusted under 35 U.S.C. 154(b) by 282 days.

(21) Appl. No.: 18/372,973

(22) Filed: Sep. 26, 2023

(65) Prior Publication Data

US 2024/0199389 A1 Jun. 20, 2024

(30) Foreign Application Priority Data

Dec. 16, 2022 (FR) ...................................... 2213548

(51) Int. Cl.
*B66D 1/58* (2006.01)
*B64D 1/22* (2006.01)
*B66D 1/48* (2006.01)
(52) U.S. Cl.
CPC .................. *B66D 1/58* (2013.01); *B66D 1/48* (2013.01); *B64D 1/22* (2013.01)
(58) Field of Classification Search
CPC ... B66D 1/14; B66D 1/16; B66D 1/54; B66D 1/58; B66D 3/18; B66D 3/20; B66D 5/00;

(Continued)

(56) References Cited

U.S. PATENT DOCUMENTS 1,249,809 A * 12/1917 Noble ...................... B66D 1/26
242/482.6
2,017,352 A * 10/1935 Quick ...................... B66D 1/14
254/350

(Continued)

FOREIGN PATENT DOCUMENTS

CN 106586862 A * 4/2017 ............... B66D 1/14
DE 4302018 A1 * 7/1994 ............... B66D 1/14

(Continued)

OTHER PUBLICATIONS

French Search Report for Application No. FR 2213548 dated Jul. 31, 2023.

*Primary Examiner* — Victoria P Augustine
*Assistant Examiner* — Henrix Soto
(74) *Attorney, Agent, or Firm* — MARSHALL, GERSTEIN & BORUN LLP

(57) ABSTRACT

A method for protecting a lifting member against an overload is described. The lifting member includes a lifting drum over which a cable is wound at the end of which a load is fixed. The lifting drum is mechanically connected to an electric motor capable of ensuring its rotation. The mechanical connection includes a clutch or equivalent device, has at least two distinct operating thresholds: a first threshold, the exceeding of which generates the freewheel operation of the lifting drum with respect to the kinematic chain coming from the electric motor, and a second threshold, of value greater than that corresponding to the nominal load of the lifting member, but of value less than that of the first threshold, generating the braking of the rotation of the lifting drum, and an attempt to progressively stop said rotation of the drum.

13 Claims, 7 Drawing Sheets

(58) Field of Classification Search
CPC ... B66D 5/02; B66D 5/12; B66D 5/14; B66D
5/18; B66D 2700/03; B66D 2700/07;
B66C 1/40; B64D 1/02; B64D 1/22
See application file for complete search history.

(56) References Cited

U.S. PATENT DOCUMENTS

| | | | | |
|---|---|---|---|---|
| 3,572,482 A * | 3/1971 | Kalpas | F16D 67/02 | |
| | | | 192/223.1 | |
| 4,004,780 A * | 1/1977 | Kuzarov | B66D 1/16 | |
| | | | 254/347 | |
| 4,118,013 A * | 10/1978 | Christison | B66D 5/14 | |
| | | | 192/223.2 | |
| 4,234,167 A * | 11/1980 | Lane | B66D 1/50 | |
| | | | 254/309 | |
| 4,372,535 A * | 2/1983 | Gibson | B66D 1/50 | |
| | | | 254/319 | |
| 6,244,449 B1 * | 6/2001 | Pech | B66D 1/16 | |
| | | | 254/303 | |
| 7,077,245 B2 * | 7/2006 | Kuivamaki | F16D 59/00 | |
| | | | 188/73.1 | |
| 8,192,126 B1 * | 6/2012 | Young | B66D 1/14 | |
| | | | 254/375 | |
| 9,988,249 B2 * | 6/2018 | Maghsoodi | F16D 13/75 | |
| 10,066,683 B2 * | 9/2018 | Davies | B66D 1/16 | |
| 10,087,056 B2 * | 10/2018 | Hartmann | B66D 1/12 | |
| 10,112,810 B2 * | 10/2018 | Golder | H02K 7/11 | |
| 10,150,655 B2 * | 12/2018 | Hiekata | B66C 13/46 | |
| 10,315,896 B2 * | 6/2019 | Kawai | B66D 5/30 | |
| 10,421,650 B2 * | 9/2019 | Schmidt | B66D 1/7415 | |
| 10,759,638 B2 * | 9/2020 | Lautwein | B66D 1/12 | |
| 10,947,094 B2 * | 3/2021 | Maghsoodi | B66D 1/16 | |
| 10,948,025 B2 * | 3/2021 | Maghsoodi | F16D 23/12 | |
| 11,092,204 B2 * | 8/2021 | Maghsoodi | F16D 65/567 | |
| 11,161,723 B2 * | 11/2021 | Honjo | B66D 5/14 | |
| 2003/0151037 A1 * | 8/2003 | O'Fallon | B66D 1/22 | |
| | | | 254/344 | |
| 2020/0140245 A1 * | 5/2020 | Yasuda | B64D 1/22 | |
| 2020/0207596 A1 * | 7/2020 | Hausladen | B66D 5/18 | |
| 2021/0395052 A1 * | 12/2021 | Topp | B66C 13/30 | |

FOREIGN PATENT DOCUMENTS

| | | | | | |
|---|---|---|---|---|---|
| EP | 0413189 A1 * | 2/1991 | | E02D 7/08 | |
| EP | 2957788 A1 * | 12/2015 | | F16D 7/10 | |
| JP | H08119579 A * | 5/1996 | | | |
| KR | 20100052424 A * | 5/2010 | | B66D 1/505 | |
| WO | WO-2008/088220 A1 | 7/2008 | | | |
| WO | WO-2022/221751 A1 | 10/2022 | | | |

* cited by examiner

METHOD FOR PROTECTING A LIFTING MEMBER AGAINST AN OVERLOAD AND DEVICE IMPLEMENTING THIS METHOD

FIELD OF THE INVENTION

The present invention relates to the technical field of lifting members, and more specifically, hoists, and even more specifically, hoists embedded on aircraft and, in particular, helicopters.

BACKGROUND

A hoist is traditionally constituted of at least one drum, also called lifting drum, associated with kinematics ensuring the rotation of the drum on itself, in order to enable the winding and the unwinding of a lifting cable, at the end of which a load is fixed.

One of the problems to which the use of such a hoist conflicts, resides in the safety to be conferred to the hoist and to the associated kinematics, in case of overload. Such an overload can result, in particular when the hoist is embedded on a helicopter, from the fall of an operator connected to the hoist by the cable, from the engagement of the free end of the lifting cable to any fixed point of the shaft, pylon, etc. type.

In the absence of a suitable safety device, this occurrence can directly affect the integrity of said operator, and/or the integrity of the helicopter and, in particular, generate their fall with associated dramatic consequences.

Such safety devices are known, which induce, in case of detecting the exceeding of a limit load, the unwinding of the cable. These devices traditionally call upon a friction clutch system, constituted of one or more friction discs and a spring, said spring being tared to a value corresponding to the limit mass or limit load beyond which the unwinding of the cable is sought to generate.

Doing this, when the limit load is reached, the friction disc(s) no longer adhere(s), for example to the drum, releasing the rotation of it, and consequently, the unwinding of the cable, with, as a first approximation, the absence of friction forces, other than simple friction forces of the axis of the drum on the windings which receive it. Therefore, thus, as long as the load is greater than the taring value of the spring, the kinematic chain is free. However, when the torque being exerted on the drum decreases, in particular below the threshold defined by the taring of the spring(s), the adherence of the friction disc(s), which always exists, returns and makes it possible to dampen, even stop the fall of the load.

If such a system makes it possible to ensure a certain protection in case of overload, the implementation of a friction clutch is relatively sensitive and complex, and requires periodic controls, in order to ensure its correct operation according to the limit load that is sought to be imposed on the system.

Thus, furthermore, such a system lacks accuracy in terms of triggering threshold, due to the implementation of environmental and operating principle trims, a taring defect of the spring(s) can generate the risk of letting the load fall freely, even not be triggered in case of overload. The control of such springs is therefore determinant to optimize the safety.

Moreover, due to the operating mode of such a system, in case of overload, the rupture of the kinematic chain can lead to the complete unwinding of the cable without being able to oppose this. Doing this, such a system has proved to be ineffective for preserving the integrity of an operator connected to the hoist in case of fall, the latter being able to be severely affected at the end position of the unwinding of the cable, resulting from the sudden deceleration of said fall, even in case of impact of said operator with the ground.

One of the aims of the present invention is to propose a system which is more reliable in terms of safety, in terms of adjusting the triggering threshold in case of overload and also in terms of modularity of said triggering threshold of the system, according to the operating conditions of the hoist and, consequently, of the helicopter within which said hoist is embedded.

SUMMARY OF THE DISCLOSURE

To this end, the invention first relates to a method for protecting a lifting member against an overload, the lifting member comprising a lifting drum, over which a cable is wound at the end of which a load is fixed, said drum being mechanically connected to an electric motor, in particular, by a clutch or equivalent device.

This method comprises at least two distinct operating thresholds:

a first threshold, the exceeding of which generates the freewheel operation of the lifting drum with respect to the kinematic chain coming from the motor;

a second threshold, of value greater than that corresponding to the nominal load of the lifting member, but of value less than that of the first threshold, generating the braking of the rotation of the lifting drum and an attempt to progressively stop said rotation of the drum.

In other words, and according to a first aspect of the invention, the method first consists of enabling a free rotation of the drum, according to the freewheel principle after the triggering of the first threshold, i.e. when a torque greater than a determined value is exerted on the drum by the cable, then, after freewheel unwinding of a part of the cable due to the overload thus exerted, to attempt a slowing, even the stopping of this free rotation of the drum through the effect of the second threshold, to thus oppose the complete unwinding of the cable, in the possibility of the occurrence of an overload.

According to an advantageous feature of the invention, the method consequently consists of attempting the re-coupling of the lifting drum on the kinematic chain, and alternatively, when the attempt to stop this free rotation is not possible, due to, for example, the engagement of the end of the cable in a fixed point, to give the operator of the lifting member, sufficient time to possibly make the decision to cause the severing of said cable.

Thus, and according to the invention, the method consists, after exerting a torque on the lifting drum greater than or equal to said first threshold, and when the slowing otherwise the stopping of the rotation of the drum is not possible, in particular due to the persistence of said torque exerted on the drum beyond said first threshold, of generating an automatic re-triggering of the clutch or of the equivalent device according to a determined periodicity, and in this case, less than or equal to 5 seconds, specific to mechanically re-coupling the lifting drum and the electric motor. Typically, if, notwithstanding this re-triggering attempt, the torque remains greater than said first threshold, the free rotation of the drum with respect to the kinematic chain is activated again.

The invention also relates to a method for protecting a lifting member against an overload, wherein the lifting member is constituted of a capstan drum associated with a storage drum of the cable. The method of the invention, in such a configuration, is identical to that disclosed above, the storage drum thus being provided with brakes, capable of ensuring the minimum residual voltage between the storage drum and the capstan, in order to enable the correct operation of the lifting member.

The invention finally relates to a device for protecting the lifting member against an overload, in order to enable the operation of said lifting member according to the method disclosed above.

The lifting member comprises:

a lifting drum, over which a lifting cable is wound at the end of which a load is fixed;

a motor provided with a rotary shaft, capable of rotating the lifting drum;

a clutch or equivalent device mounted on the mechanical connection connecting the motor to the lifting drum and capable of uncoupling the rotary shaft from the motor and the drum.

According to the invention, the clutch or equivalent device is provided with elements capable of ensuring the free rotation of the drum with respect to the motor shaft, as soon as the torque exerted by the lifting cable on the drum is greater than a predetermined threshold value-corresponding to the first threshold; the lifting member is further provided with means capable of generating the slowing, even the stopping of the rotation of the lifting drum, after free rotation of the latter, so as to enable the re-coupling of the rotary shaft of the motor on the lifting drum.

Typically, these means are constituted of brakes, acting on the lifting drum, and the maximum braking capacities of which correspond to said second threshold.

According to the invention, the clutch or equivalent device is constituted of a removable cartridge, called overload cartridge, which can be coupled respectively to the motor shaft and to the lifting drum. This cartridge is constituted of a dome receiving two rings independent of one another. These rings engage with one another by way of a plurality of balls received in housings of a suitable shape of one of said rings and projecting outside of said housings in order to also be received in through-holes provided within the other ring, springs, advantageously provided within a cage, exerting a pressure on said balls, the assembly thus defining said first threshold. One of said rings is integral with the dome, itself mechanically connected to the motor shaft, and the other ring is integral with a means capable of rotating the lifting drum.

According to an advantageous feature of the invention, the housings provided within one of the rings and intended to receive balls, communicate with an internal annular recess provided within said ring, of depth less than said housings, this communication being achieved by means of non-radial ramps.

Moreover, according to the invention, the device of the invention also comprises additional braking means, in this case, constituted of friction discs, which can engage with a member integral with said ring, mechanically connected to the lifting drum, the upper action limit of said brakes constituting said second threshold.

BRIEF DESCRIPTION OF THE DRAWINGS

The way in which the invention can be achieved, the advantages which result from it will best emerge from the example of an embodiment below, given for information and in a non-limiting manner, in support of the accompanying figures.

FIG. 1 is a schematic representation illustrating the operating principle of the method and of the device according to the invention, in the normal operational position in the scope of a lifting member constituted of a capstan.

FIG. 2 is a view similar to FIG. 1 illustrating the operation of the method and of the device of the invention in overload mode less than said first threshold.

FIG. 3 is a view similar to FIG. 1 illustrating the operation of the method and of the device of the invention in overload mode greater than said first threshold.

DETAILED DESCRIPTION

Figures 1, 2, 3:
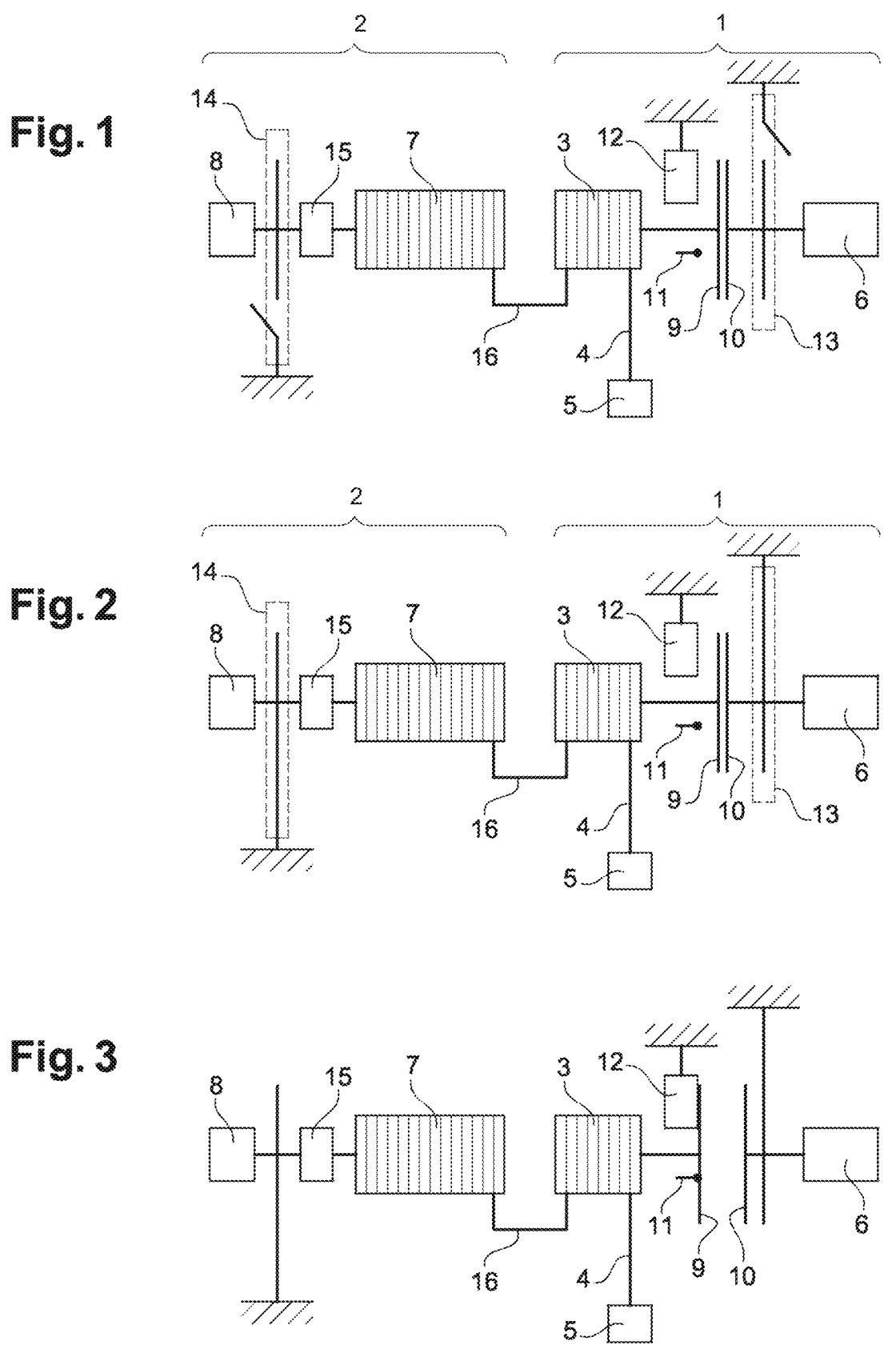
Figure 4:
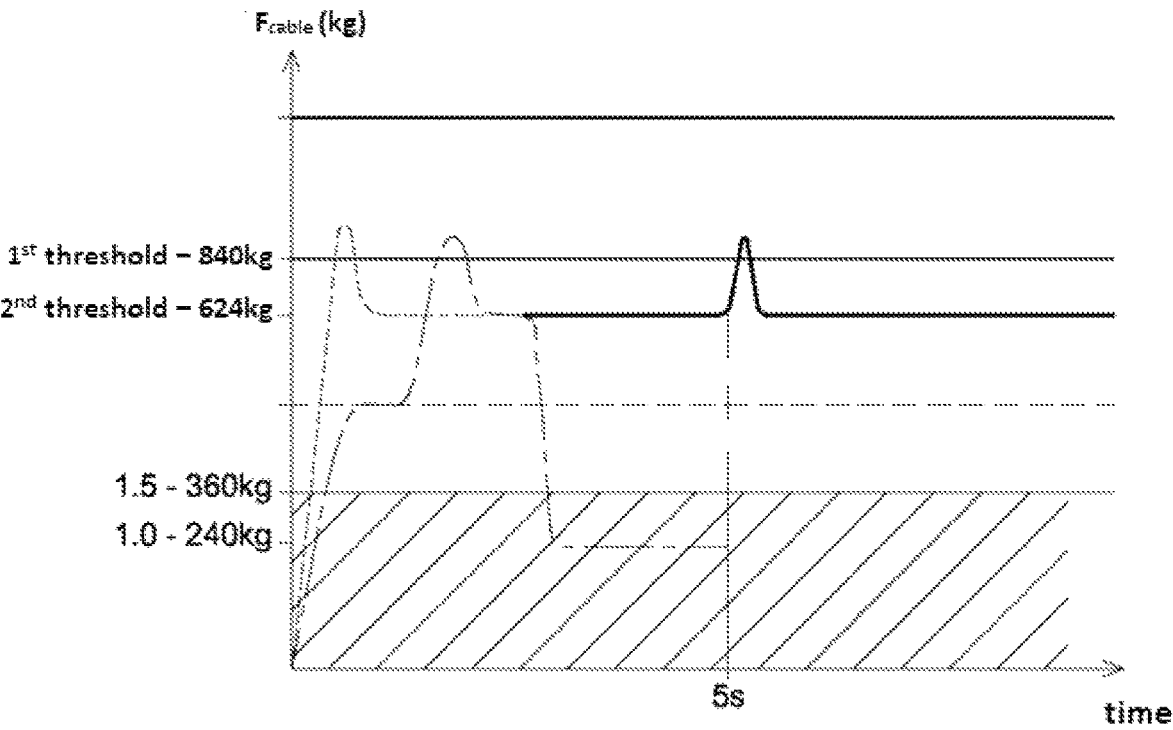
FIG. 4 is a graph illustrating over time (X-axis) and the load (in kg) (Y-axis), applied on the lifting member integrating the device of the invention, the different operating modes of said device.

Within FIGS. 1 to 3, the general operating principle of the method for detecting overload according to the invention, has been represented.

Within these, the device of the invention is integrated within a hoist, and in this case, a capstan hoist. It must however be understood that, in the spirit of the invention, the device can operate with a conventional hoist, i.e. the lifting drum of which also ensures the storage.

Thus, within these figures, the lifting assembly (1) and the storage assembly (2) are schematically distinguished.

The lifting assembly (1) is constituted of a so-called capstan drum (3), ensuring the winding and the unwinding of a cable (4), at the end of which a load (5) is fixed. The drum (3) is moved in rotation under the action of an electric motor (6). If, in the example described, one single capstan drum is illustrated, the invention also aims for the implementation of a capstan comprising two drums mounted parallel to one another, each of said drums only receiving one single layer of cable coils at its periphery.

Consequently, a storage drum (7) appears at the storage assembly (2), on which are stored several layers of cable coils coming from the capstan drum(s) (3), said storage drum (7) being moved in rotation by an electric motor (8).

In FIGS. 1 to 3, two coupling elements (9, 10) of the mechanical connection between the electric motor (6) and the capstan (3) are schematised, respectively in the actual coupling position within FIGS. 1 and 2, i.e. in normal operation of the device, and in case of overload less than a first threshold, and in the uncoupled position within FIG. 3, i.e. in case of detection of overload greater than said first threshold.

These coupling members will subsequently be described in detail. They are, however, thus designed, such that when an overload is detected, i.e. when a torque of a value greater than a threshold value (the first threshold) is exerted on the capstan (3) under the action of the cable (4), said members (9, 10) are uncoupled like a clutch, owing to an axial movement of one of said members with respect to the other. In this event, the coupling member (9) integral with the capstan (3) automatically activates a switch (11) (illustrated schematically in contact with said coupling member (9) in FIG. 3).

FIG. 1 illustrates, as already indicated, the normal operation of the lifting member, i.e. in the absence of any overload. In this configuration, it can be observed that the two coupling members (9) and (10) are schematically in contact with one another, in other words, that there is a coupling between the kinematic chain and the drum of the capstan (3). Consequently, the service brake (not represented) associated with the electric motor (6) makes it possible for the lifting member to be subjected to a useful load greater than the nominal load determined by the manufacturer, but naturally less than said first threshold.

FIG. 2 illustrates an intermediate operating mode, according to which an overload is detected, always less than said first threshold, but however greater than the useful load mentioned above. This operating mode is considered to subsequently intervene upon the detection of an overload greater than said first threshold, with the aim of enabling, as well as it will subsequently be described, the rearming or re-coupling of the kinematic chain on the capstan drum (3).

Finally, FIG. 3 illustrates the operating mode according to which an overload greater than said first threshold is detected. Such an overload can, for example, result from the fall of an operator connected to the cable (4), or also from the engagement of the end of said cable, provided or not with a load, in a fixed point, of the pylon, shaft, etc. type.

In such a configuration, it is sought that the drum of the capstan (3) can freely rotate, and to this end, the kinematic chain connecting the motor (6) to the capstan (3) is uncoupled. This uncoupling is conveyed by an axial movement of one of the coupling members (9, 10), and in this case, of the member (9) which, due to this movement, activates the switch (11).

This activation of the switch (11) generates the stopping of the rotation of the electric motor (6) by means of a ratchet wheel (13), and more specifically the rotation inherent to inertia, since in reality, the activation of said switch first generates the stopping of the electrical supply of said motor (6).

Furthermore, the activation of the switch (11) also generates the stopping of the electrical supply of the electric motor (8), further to the closing of the ratchet wheel (14).

Consequently, due to the nature of the hoist described, in this case, the capstan hoist, a residual voltage must be preserved on the cable strand (16) extending between the capstan (3) and the storage drum (7). To this end, braking members (12), typically constituted of friction discs, engage with the storage drum (7), to limit its free unwinding.

In case of detection of an overload on the capstan (3) greater than said first threshold (FIG. 3), the capstan (3) is not only uncoupled from the drive motor (6), but thus operates vis-à-vis the latter like a freewheel, enabling the free unwinding of the cable as needed. The brakes (12) acting on the storage drum (7) exerting a braking action a lot less than the overload in question, are not of the nature to affect the free rotation of said storage drum and therefore, consequently the free unwinding of the cable.

The lifting member of the invention is thus designed such that the free rotation of the capstan (3), consecutively to the detection of an overload greater than said first threshold, is limited over time. This free rotation actually leads to the absence or quasi absence of torque exerted on the lifting drum or the capstan (3). As mentioned in the preamble, this free rotation of the drum is attempted, after this drastic decrease in the torque in order to slow, even stop, to thus oppose the complete unwinding of the cable, and alternatively, when the attempt to stop this free rotation is not possible, for example, due to the engagement of the end of the cable in a fixed point, to enable the operator to sever the cable.

To this end, the brakes (12) associated with the lifting drum or with the capstan define a second threshold, and attempt to result in the sought slowing or stopping of said lifting drum. Consequently, the device of the invention generates the re-coupling of the members (9, 10), in order to clutch the lifting drum on the motor (6), and thus resume a normal operation of the lifting member. If, however, the event at the origin of the overload persists, said members (9, 10) are uncoupled again, generating again the free rotation of the lifting drum or capstan.

Typically, if the rotation speed of the motor becomes greater than or equal to that of the unwinding of the cable, and this, consecutively to a successful attempt to re-couple the two coupling members (9, 10), the lifting member returns to its normal operation.

If, however, this re-coupling attempt fails, due to maintaining the torque exerted on the capstan (3) greater than the first threshold, for example, due to the engagement of the end of the cable in a pylon- or shaft-type fixed point, the freewheel unwinding continues, and after another attempt to re-couple proves unsuccessful, the operator can thus make the decision to sever the cable, in order, in particular, to not impact the integrity of the helicopter within which the lifting member is embedded.

In the example of an embodiment described, these attempts to re-couple the two coupling members (9) and (10) occur every 4 or 5 seconds.

In relation to FIG. 4, a graph illustrating the different operating modes of the lifting member according to the invention, depending on time (X-axis) and load (in kg) (Y-axis), has been represented, in this case, for a nominal load of 240 kg, for example.

Within this graph, the following has been represented:
said first threshold, in this case, fixed at 3.5 times the nominal load, that is 840 kg;
said second threshold, in this case, fixed at 2.6 times the nominal load, that is around 624 kg.

Within this graph, the regular dashed line curve (on the far left in the figure) illustrates the application of a sharp or sudden overload, typically resulting from the fall of an operator fixed to the free end of the cable, or following a slack cable which is continued by a sudden strain of said cable, and in any case, exceeding said first threshold. Doing this, the device of the invention almost immediately induces the operation of the capstan (3) in freewheel mode, being conveyed on said pitch curve by an inflection and the lowering of the value of the load detected until reaching the level of said second threshold, corresponding to the activation of brakes (12) on the capstan.

At this time:

either the action of the brakes is sufficient to generate the actual slowing of the rotation of the lifting drum or capstan, and consequently the durable re-coupling of the coupling members (9, 10), and therefore the kinematic chain on said capstan, and the normal operating mode of the lifting member is thus returned to, being conveyed by another inflection of the curve in the downward direction, or the overload persists, and said members (9, 10) are once again uncoupled, being conveyed on the curve by another ascension then inflection downwards (solid line in the figure), resulting from the new freewheel operating mode of the lifting drum or capstan. Once again, the brakes (15) will attempt a slowing of the rotation of the lifting drum or capstan, and consequently, a re-coupling of the members (9, 10), and if this new attempt fails for the reasons mentioned above, the operator having had a sufficient duration, typically 10 seconds to make a decision, can decide to sever the cable.

The dashed and irregular line curve illustrates a progressive overload, which can result from the engagement of the end of the cable in a pylon, shaft, etc. If this occurs, when this load reaches said second threshold, the braking system (15) attempts to brake and to reduce the load thus applied on the lifting drum or capstan. If this braking is sufficient, the curve descends into normal operating mode. If, however, this braking is insufficient, and if the load increases further and exceeds said first threshold, the configuration described in the preceding paragraph is reached.

Figure 5:
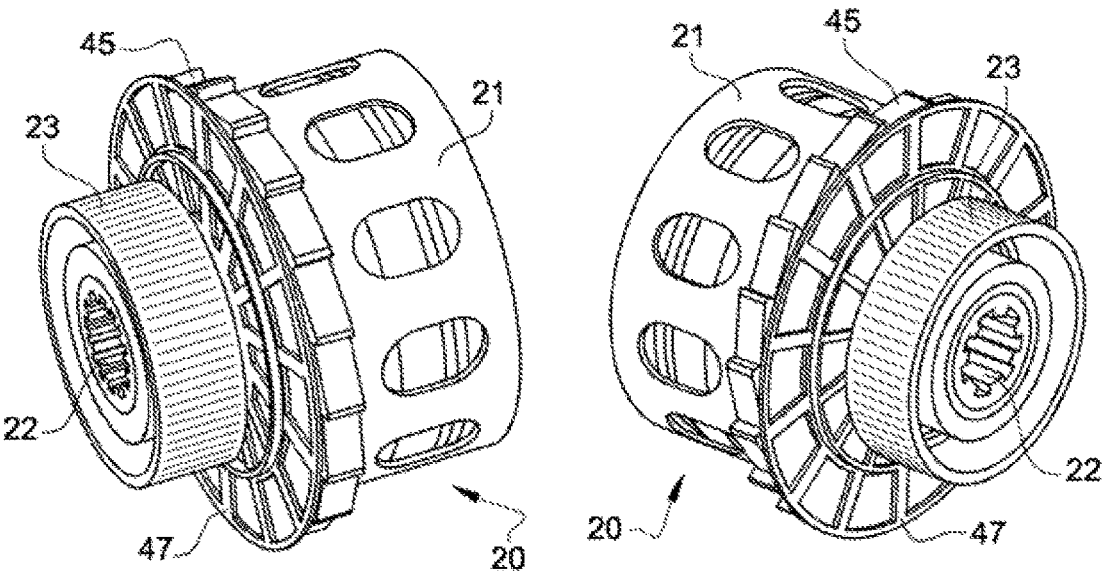
FIG. 5 is a schematic, perspective representation of one of the elements of the device for preventing an overload according to the invention.

Below, the device of the invention is described more accurately. Within FIG. 5, an overall schematic view of the overload cartridge (20) has been represented, constituting one of the key elements of the device of the invention, and within which the coupling members (9, 10) intervene. This overload cartridge (20) is removable, in this sense that it is possible to interchange it with another cartridge provided with other features, in particular, in terms of overload detection thresholds. Actually, it is provided with coupling means, in this case (22) on the capstan (3) and on the motor shaft coming from the motor (6) (not represented). In this figure, a toothed pinion (23) has also been represented, intended to engage with the braking device (12) of the lifting drum or capstan (3), and the teeth (45) of the ratchet (13), the function of which will subsequently be described.

Figure 15:
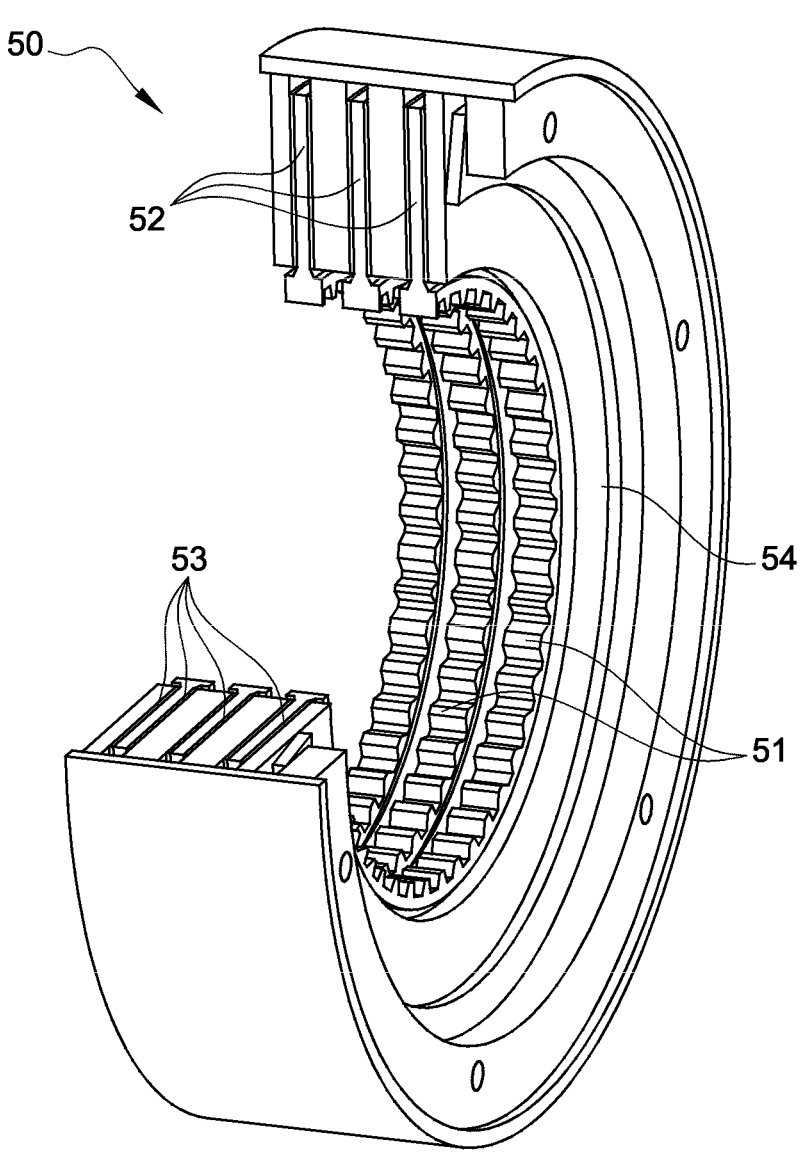
FIG. 15 is a partially exploded, schematic representation of the braking device associated with the lifting drum of the lifting member of the invention.

Typically, the toothed pinion (23) is capable of being meshed in a gear ring (51) of suitable shape and dimension, provided inside the braking device (50), described in more detail within FIG. 15.

Figure 6:
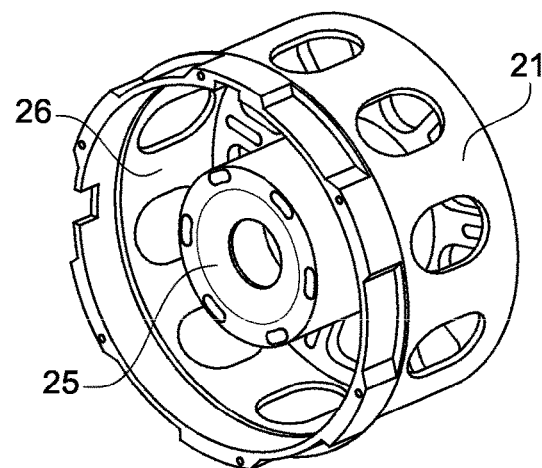
FIG. 6 is a schematic, perspective representation of the dome implemented in the element of FIG. 5.
Figure 7:
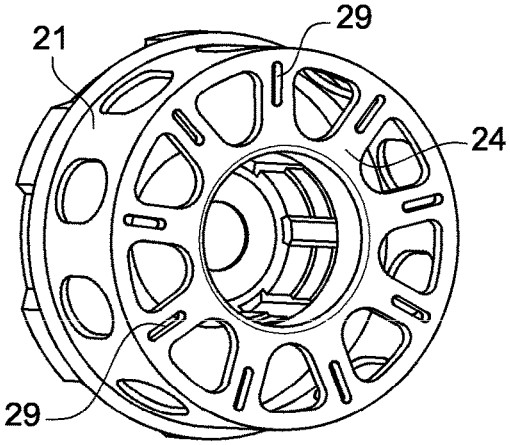
FIG. 7 is a view similar to FIG. 6 according to another viewing angle.

This cartridge (20) is, in reality, constituted of a dome (21), typically metallic, of circular cross-section, and having a rotational symmetry, such as can be observed in FIGS. 6 and 7. The dome (21) has a bottom (24), in this case perforated, from which a cylindrical central projection (25) comes, in which is housed the end of the shaft coming from the electric motor (6) ensuring the rotation of the lifting drum or of the capstan (3). The dome has, in the position opposite the bottom (24), an opening (26), intended to enable the introduction of the different elements constituting the device of the invention within the dome (21).

Figure 8:
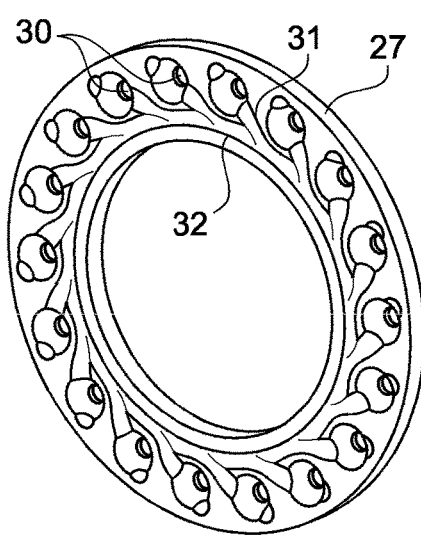
FIG. 8 is a schematic, perspective representation of one of the rings entering into the constitution of the element of FIG. 5, intended to be positioned at the bottom of the dome represented in FIGS. 6 and 7.
Figure 8:
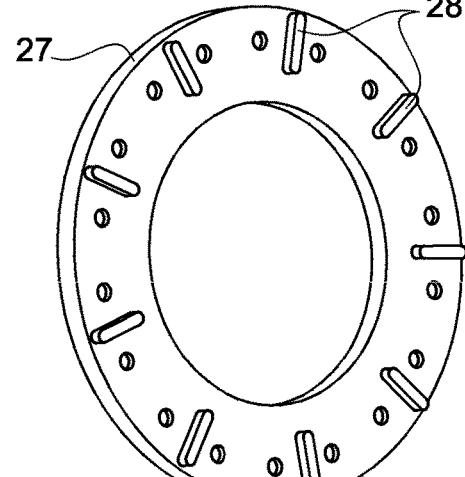

The bottom (24) of the dome (21) is intended to receive a first annular ring (27), illustrated in detail in FIG. 8. This ring (27) is reversibly integral with the bottom of the dome by means of radial projections (28), which can be received within through-holes (29) provided within the bottom (24) correspondingly, both in positioning and in dimensions.

The other face of the first ring (27) is provided with housings (30) of mainly truncated shape, provided periodically in the vicinity of the periphery of said ring. Each of these housings (30) communicates by means of an inclined ramp (31) with a recess or annular track (32), positioned in the vicinity of the internal diameter of said ring, and of depth less than that of the housings (30). The function of these different elements will subsequently be described. The housings (30) are intended to each receive a ball (33) made of a material of high hardness, and typically made of steel.

Figure 9:
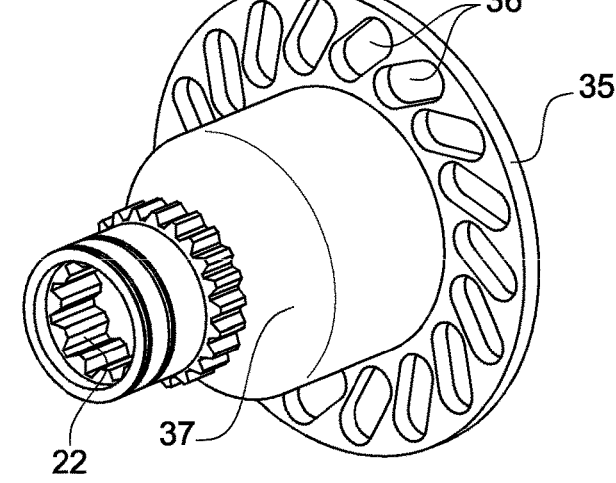
FIG. 9 is a schematic, perspective representation of the opposing ring intended to engage with the ring of FIG. 8, further associated with the removable connection means on the motor shaft.

Said first ring (27) is intended to engage with a second ring (35), illustrated for example in FIG. 9, integral with a member (37) capable of coming on an element of corresponding shape, to ensure the rotation of the lifting drum or capstan (3).

This engagement results from the presence within said second ring (35) of through-holes (36), hippodrome-shaped, oriented obliquely with respect to the radial direction, located in vertical alignment with the active zone of the first ring, i.e. with the zone comprising the housings (30) and the annular recess (32). The width of these through-holes (36) is slightly greater than the diameter of the balls (33), such that the balls can be received in these spaces.

Figure 12:
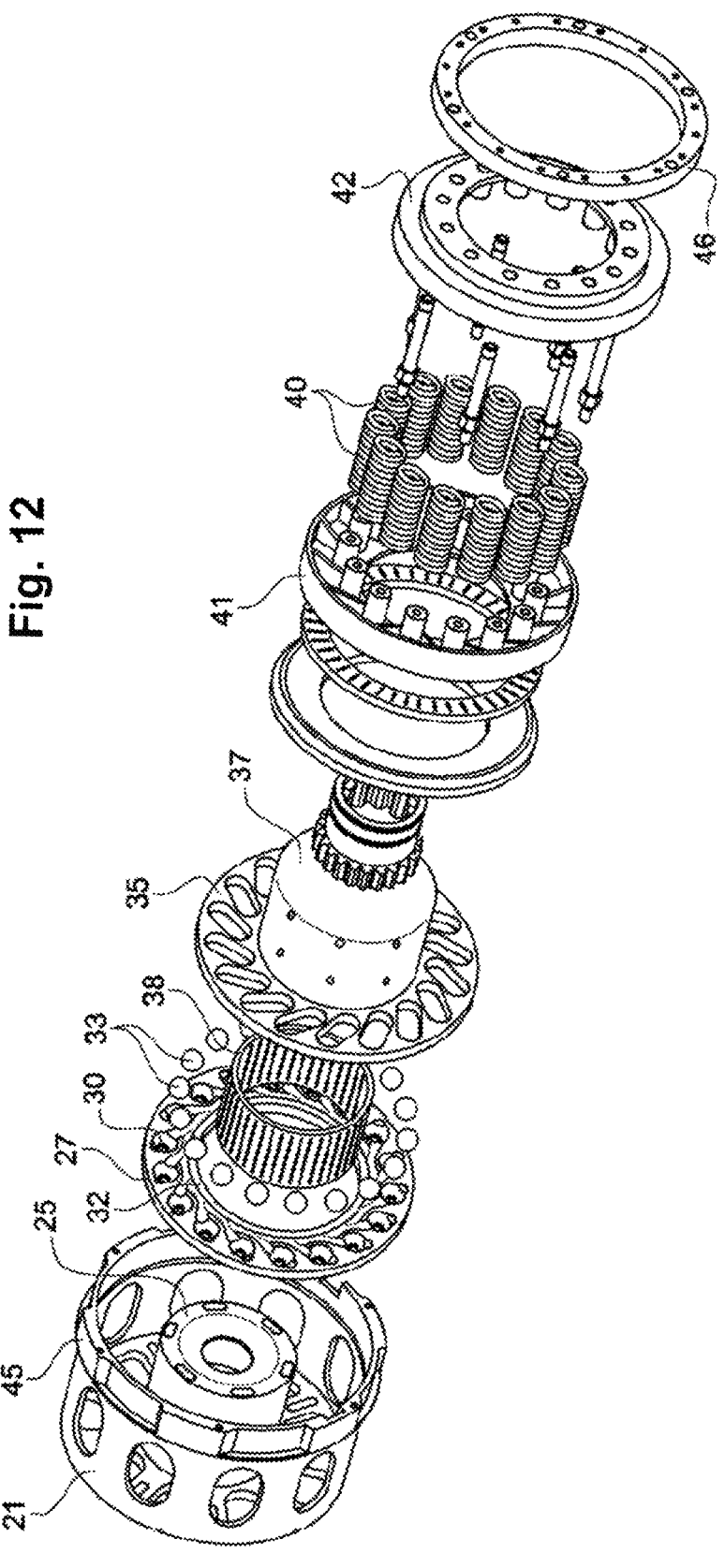
FIG. 12 is a schematic, perspective, exploded representation of the assembly of the device of the invention.

FIG. 12 illustrates, in exploded perspective, the different elements constituting this overload cartridge. Thus appearing within this figure, in particular, the two respective rings (27, 35) intended to engage with one another, and the operating principle of which will subsequently be described in detail.

At the same time, the member (37) with which the second ring (35) is integral, can freely rotate, almost at the external stresses, around the projecting zone (25) of the dome (21), a needle bearing (38) being interposed between the two.

Moreover, the first overload triggering threshold mentioned above is mechanically ensured, by means of a plurality of springs (40), confined in a cage defined by two opposing plates (41) and (42), coaxial with the dome (21) and the rings (27, 35). One (41) of said plates of the cage bears against the balls (33) (see FIGS. 10 and 11), and the other plate (42) is integral with the free upper rim of said dome by means of an annular flange (46), doing this, constituting a fixed application point of the springs (40).

Figure 10:
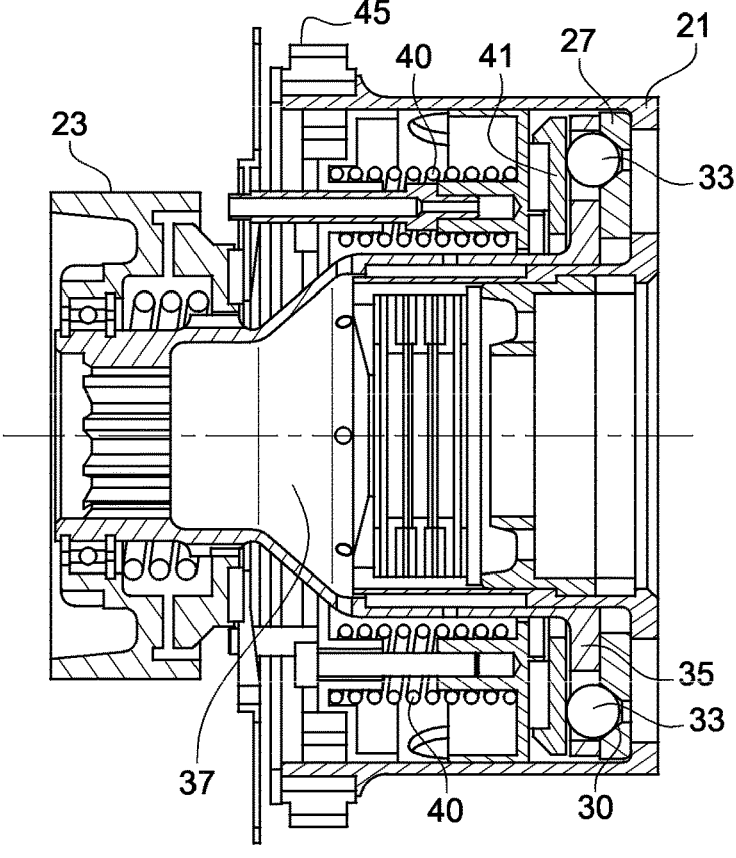
FIG. 10 is a schematic representation illustrating the element of FIG. 5 in normal operation, i.e. in the absence of overload.
Figure 11:
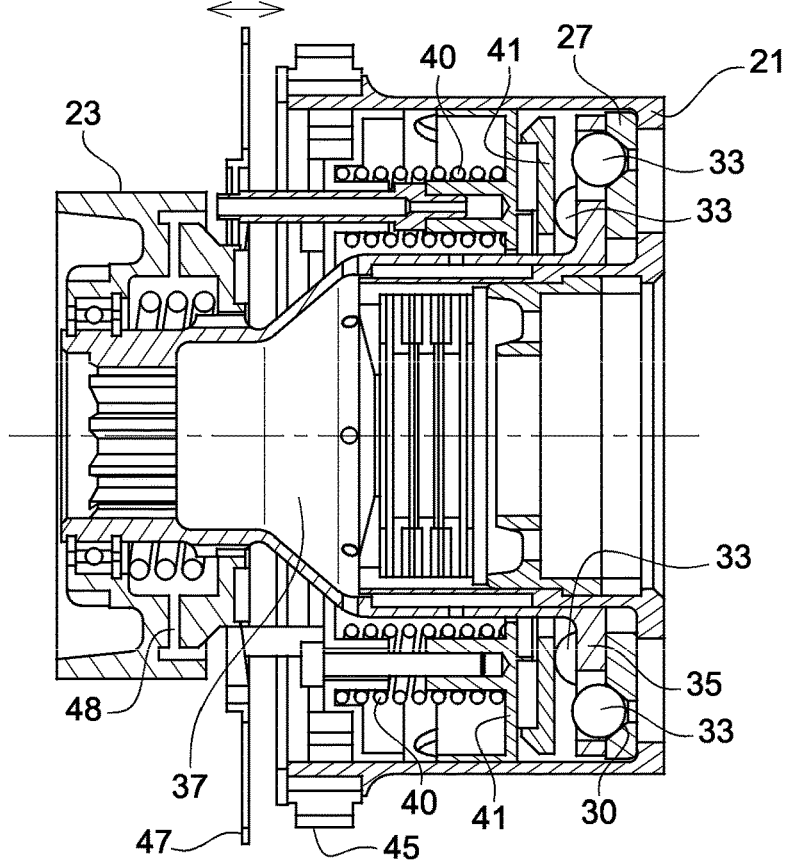
FIG. 11 is a view similar to FIG. 10, illustrating the device of the invention in overload mode greater than said first threshold.

Within FIGS. 10 and 11, the overload cartridge has thus been illustrated, respectively in the normal operating position, i.e. wherein the rotation of the motor shaft generates the rotation of the capstan, and in the uncoupling position, generating the freewheel mode rotation of said capstan with respect to the motor (6).

Figure 13:
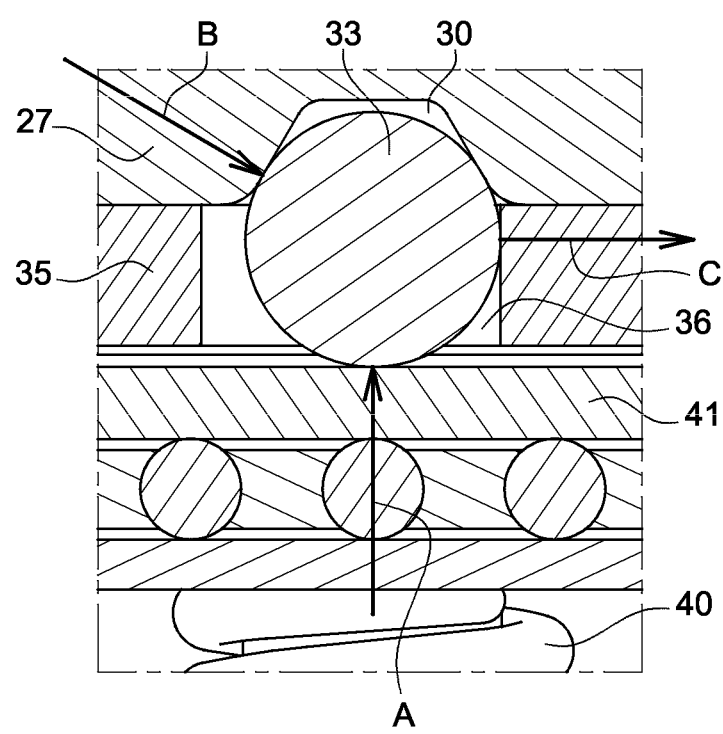
FIG. 13 is a cross-sectional view of the engagement between the two opposing rings of FIGS. 8 and 9, in normal operation mode of the device of the invention.
Figure 14:
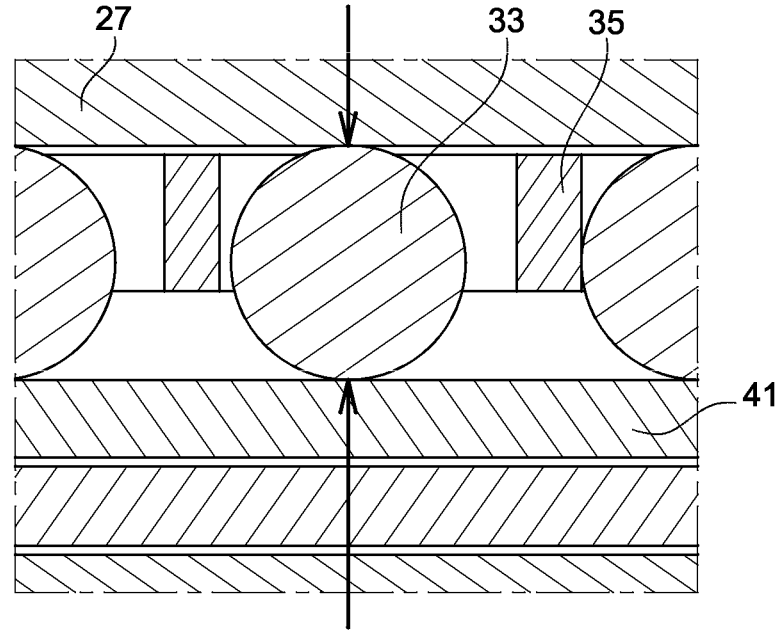
FIG. 14 is a view similar to FIG. 13 in overload mode greater than said first threshold.

FIGS. 13 and 14 illustrate this operation. In FIG. 13, corresponding to the normal operating mode, i.e. wherein there is an actual coupling between the motor shaft and the capstan, the balls (33) are present in the housings (30) of the first ring (27), and consequently engage via the through-holes (36) provided within the second ring (35) with the latter. The respective components of action of the springs (40) being exerted on the balls (33), and the engagement between the balls (33) with the second ring (35) have been illustrated by three arrows A, B and C, broken down into a tangential component and a radial component. The torque being exerted on the capstan due to the load (5) is conveyed by a lower force in the direction radial to that exerted by the springs (40), such that the two rings are coupled.

When the torque in question increases, in particular due to an overload, and more specifically, since it exceeds a determined threshold value (the first threshold) by the spring constant resulting from the action of the springs (40) (FIG. 14), the radial component resulting from said torque becomes greater in value than the action exerted by the springs (40), inducing the exiting of the balls (33) outside of their respective truncated housing (30) and their movement in the direction of the internal annular recess (32), such that due to the lesser depth of said recess (32) with respect to the diameter of the balls, the latter generate the axial movement of the plate (41) and consequently, of the plate (47). The balls (33) thus have, within the internal annular recess (32), thus constituting a ball bearing, enable the freewheel mode rotation of all of the assembly of the two rings (27, 35) with respect to the assembly (40-42), and actually, the operation of the freewheel mode capstan (3) with respect to the motor shaft, and therefore the free unwinding of the cable (4).

This axial relative movement of the plate (41) combined with the compression of the springs (40) also generates the movement in the same direction of a plate (47), and consequently of a clutch system (48), thus mechanically connecting the toothed pinion (23) and the coupling member (37).

In this way, due to the engagement of the pinion (23) with the braking device (50), integral with the frame of the lifting member, and constituted of friction discs (52) interposed between counter discs (53), the braking of the rotation of the lifting drum or capstan (3) is ensured. Its action is determined by the clamping of said discs, typically ensured by a Belleville-type system (54), even a spring system favoring overlapping, well-known for this application. The maximum braking force constitutes said second threshold of the invention.

After action of this braking device, for which it must be reminded that it occurs after detection of an overload, and therefore after free rotation of the lifting drum or capstan, the rotation speed of said capstan is slowed, and consequently, as the torque exerted on said capstan is drastically reduced, precisely due to the free rotation, the re-coupling of the rings (27) and (35) is attempted. This attempt succeeds if the rotation speed of the motor shaft is greater than that of the lifting drum or capstan, generating, due to the shape and the inclination of the through-holes (36) of the second ring (35), the return of the balls (33) into their respective housing (30).

If, however, the rotation speed of the motor shaft remains less than that of the lifting drum or capstan (3), due to the persistence of the overload, the situation described above is reached, and again, the plate (47) generates the action of the braking device (12), to once again attempt the slowing, even the stopping of the rotation of the capstan (3).

According to the invention, a ratchet wheel, illustrated by the reference (45) in FIGS. 5 and 10-12, is activated when the switch (11) is itself activated, i.e. in the case of the detection of an overload greater than or equal to said first threshold. This ratchet is intended to stop the motor (6).

Consequently, a ratchet-type member (14) is also activated after detection of the overload by the switch (11). This ratchet (14) acts on the brakes (15) of the storage drum (7), in the case of a capstan hoist, such that said drum can continue its rotation, in order to preserve the sufficient strain of the cable strand (16) separating the capstan (3) of the storage drum (7), even in case of operation of the capstan (3) in freewheel mode.

According to a feature of the invention, the braking device (50) is also able to be presented in the form of a removable element. Doing this, by modifying the features of the members which constitute it, it is possible to modify its braking features, and therefore consequently, said second threshold.

Subsequently, on the one hand, it is conceived that the two characteristic thresholds of the invention are completely independent of one another, and that it is possible, due to the removable character, respectively of the cartridge (20) and of the removable element (50), to adjust the general operation of the hoist independently from one another.

The invention claimed is:

1. A method for protecting a lifting member against an overload, the lifting member comprising a lifting drum on which a cable is wound, cable at the end of which a load is fixed, said lifting drum being mechanically connected to an electric motor capable of ensuring its rotation, the mechanical connection comprising a clutch or equivalent device, wherein said method comprises at least two distinct operating thresholds:

a first threshold, the exceeding of which generates a freewheel operation of the lifting drum with respect to a kinematic chain coming from the electric motor;

a second threshold, of a value greater than that corresponding to a nominal load of the lifting member, but of a value less than that of the first threshold, generating a braking of the rotation of the lifting drum and an attempt to progressively stop said rotation of the lifting drum.

2. The method for protecting a lifting member against an overload according to claim 1, further comprising, in the case of an exceeding of said first threshold, a step consisting of attempting the re-coupling of the lifting drum on the kinematic chain intervening according to a determined periodicity.

3. The method for protecting a lifting member against an overload according to claim 2, wherein the determined periodicity is less than 5 seconds.

4. The method for protecting a lifting member against an overload wherein the lifting drum belongs to a capstan system associated with a storage drum, according to claim 1, method wherein the exceeding of said first threshold generates the braking of the rotation of the storage drum, in order to preserve a minimum strain of the cable extending between the capstan and the storage drum.

5. The method for protecting a lifting member against an overload according to claim 1, wherein generating the braking of the rotation of the lifting drum and an attempt to progressively stop said rotation of the lifting drum occurs after freewheel operation of the lifting drum has commenced.

6. A device for protecting a lifting member against an overload, said lifting member comprising:

a lifting drum on which a lifting cable is wound, cable at the end of which a load is fixed;

an electric motor provided with a rotary shaft capable of ensuring a rotation of the lifting drum;

a clutch or equivalent device mounted on a mechanical connection connecting the electric motor to the lifting drum and capable of uncoupling the motor from the drum;

wherein the clutch or equivalent device is provided with elements capable of ensuring a free rotation of the lifting drum with respect to the rotary shaft of the motor as soon as a torque exerted by the cable on said lifting drum is greater than a predetermined threshold value, called first threshold;

wherein the protection device also comprises braking means of the rotation of the lifting drum, the maximum braking capacities of which constitute a second threshold, of a value greater than that corresponding to the nominal load of the lifting member, but of a value less than that of the first threshold.

7. The device for protecting a lifting member against an overload according to claim 6, wherein the clutch or equivalent device is constituted of a cartridge, called overload cartridge, which can be coupled respectively to the motor shaft of the electric motor and to the lifting drum, said cartridge being constituted of a dome receiving two rings, independent from one another, but engaging with the other by way of a plurality of balls received in housings of suitable shape provided within one of said rings, and projecting outside of said housings in order to also be received in through-holes provided within the other ring, one of said rings being integral with the dome, itself mechanically connected to the motor shaft of the motor, and the other ring being integral with a means capable of rotating the lifting drum, springs associated with an engagement member with the braking means exerting a pressure on the balls.

8. The device for protecting a lifting member against an overload according to claim 7, wherein the housings provided within one of the rings and intended to receive the balls, communicate with an internal annular recess provided within said ring, of depth less than said housings, this communication being made by means of non-radial ramps.

9. The device for protecting a lifting member against an overload according to claim 7, wherein the cartridge is removable.

10. The device for protecting a lifting member against an overload according to claim 6, wherein the braking means of the rotation of the lifting drum are constituted of friction discs integral with the lifting member, and engaging with a toothed pinion clutched on the axis of rotation of said lifting drum in case of exceeding said first threshold.

11. The device for protecting a lifting member against an overload according to claim 10, wherein the braking means are removable.

12. The device for protecting a lifting member against an overload according to claim 6, wherein the lifting drum is a capstan associated with a storage drum moved in rotation by an electric motor, and wherein the device further comprises a ratchet wheel activated after exceeding said first threshold, and intended to act on the brakes associated with said storage drum such that said storage drum continues its rotation, in order to preserve a sufficient strain of a cable strand separating the capstan of the storage drum, even in case of operation of the capstan in freewheel mode.

13. The device for protecting a lifting member against an overload according to claim 6, wherein the braking means are engaged after commencement of free rotation of the lifting drum.

\* \* \* \* \*